United States Patent Office 3,404,492
Patented Oct. 8, 1968

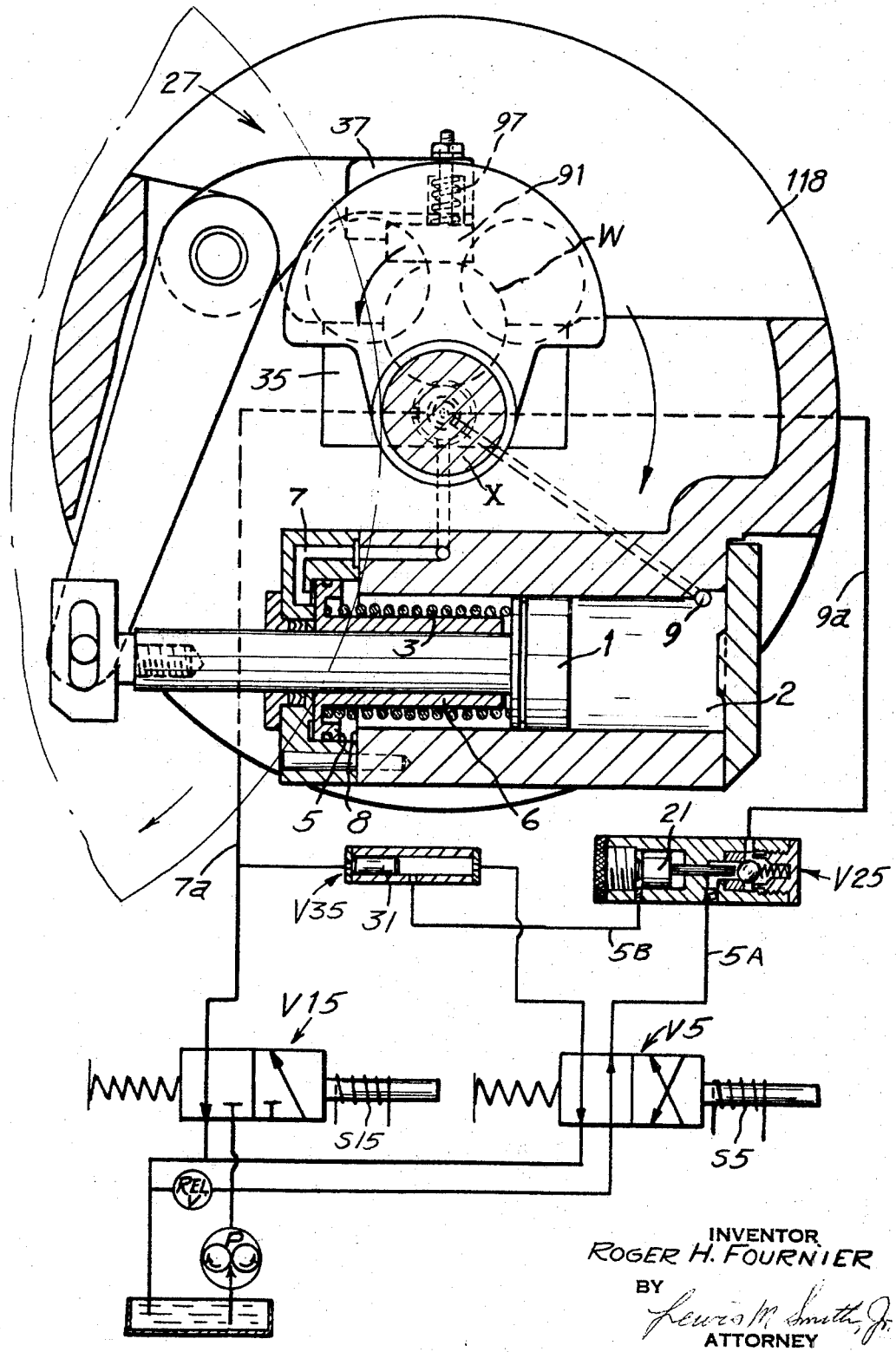

3,404,492
ROTATABLE WORK HOLDER FOR
MACHINE TOOLS
Roger H. Fournier, Millbury, Mass., assignor to Norton Company, Worcester, Mass., a corporation of Massachusetts
Filed Dec. 20, 1966, Ser. No. 603,194
6 Claims. (Cl. 51—237)

ABSTRACT OF THE DISCLOSURE

The present invention relates to improvements in rotatable work holders for machine tools wherein a work holder supports a work piece eccentrically of the axis of rotation of the work holder and has work piece restraining means mounted upon the rotatable work holder operable during a machining operation to secure a work piece fixedly relative to the work holder about a predetermined axis spaced from the axis of rotation of the work holder and operable during an angular indexing operation to allow rotation of a work piece relative to the work holder about said predetermined axis subject to frictional restraint, the improvement comprising said work piece restraining means comprising a fluid pressure actuated clamping mechanism having a pair of relatively movable pistons of different cross sectional area with an interposed coiled piston return spring wherein the smaller piston is actuated by fluid pressure in one direction to secure the work piece fixedly relative to the work holder and is overpowered and displaced a predetermined small amount by a sleeve connected to the larger piston actuated by fluid pressure in the opposite direction to allow rotation of the work piece relative to the work holder during an angular indexing operation.

Background of the invention

The field of the invention is abrading machines having a rotary tool, a rotating work piece and a rotary work holder.

The work holder of the present invention is an improvement over the work holder disclosed in U.S. Patent 3,142,941 of Fournier et al., where the Fournier et al. patent incorporated by reference U.S. Patents 2,723,503 of Mader, 3,076,296 of Joyce and Reissue 24,885 of Narel et al. based on 2,813,380. The state of the prior art is further disclosed in U.S. Patents 1,816,750 of Steiner et al. and Reissue 24,091 of Rocks. The references indicating the state of the art are incorporated herein.

The improved work holder of the present invention may replace the corresponding parts of Fournier et al., namely, cylinder or cylinders 39c (FIGURE 5) connected to work holder actuating cylinders 39a (FIGURE 2) and 39b (FIGURE 3) where a predetermined volume of hydraulic fluid under pressure is selectively admitted to the small end of cylinder or cylinders 39c to reduce the force exerted on a work piece by the respective clamping jaws 37 (FIGURES 1–4) while the auxiliary clamping elements 91 (FIGURE 4) supported by these jaws frictionally restrain work piece W.

The improved work holder of the present invention may also be used with grinding machines or other machine tools incorporating automatic angular indexing means other than that illustrated and described in Fournier et al.

Summary of the invention

In a typical crankpin grinding machine such as that illustrated in Mader, a crankshaft is rotatably supported upon a pair of spaced aligned work holders 15 and 16 by means of a pair of pot chucks 17 and 18 releasably supporting a crankshaft eccentrically of the work holders 15 and 16 by means of bearings 60 and 70 and clamping jaws 61 and 71 for rotation about the axis of the crankpin to be ground. Since the respective crankpins of a crankshaft are angularly offset, the crankshaft supported in the grinding machine must be rotated relative to the pot chucks after each crankpin is ground in order to bring the axis of the next crankpin to be ground into alignment with the axis of rotation of the work holders. The axis of the next crankpin is indexed by releasing the clamping jaws 61 and 71 with the work holders stopped in such a position that the crankshaft does not fall out of the work holders and while the clamping jaws are open the axis of the next crankpin is manually adjusted into alignment with the axis of rotation of the work holders.

The machine disclosed by Fournier et al. is an improvement over the manually indexable machine of Mader. Fournier et al. disclose an addition to a crankpin grinding machine comprising an angular indexing mechanism operable with rotating work holders cooperating with automatic means permitting the indexing of successive crankpins without having the crankshaft drop out of the work holders.

Successive crankpins are automatically indexed according to one embodiment disclosed by Fournier et al., by a straight edged camming element mounted upon the base of the grinding machine in the plane of the grinding wheel and work holders cooperating with the camming element which release the crankshaft sufficiently to permit constrained rotation of the crankshaft relative to the pot chucks. Before the angular indexing operation is performed, the crankshaft is indexed axially to place the crankpin to be ground in axial alignment with the grinding wheel. The camming element moves into and out of the path of the crankshaft between a retracted position clear of the crankshaft and an operative position in the path of the next crankpin to be ground, and the straight edged camming element is disposed chordwise of the work heads at a distance from the center of rotation of the work heads equal to the radius of the crankpin to be ground. Before the camming element is moved to its operative position the work holders securing the crankshaft relative to the pot chucks are released sufficiently permitting constrained rotation of the crankshaft relative to the pot chucks in response to engagement of a crankpin with the camming element and at the same time, the crankshaft is maintained securely in the pot chucks. Under these conditions, the rotation of the work holders brings the crankpin to be ground into engagement with the camming element and thence along the camming surface of that element into the proper position for the grinding operation.

The instant invention may also be embodied in an arrangement including a number of camming elements equal to the number of crankpins all mounted on a work traversing table equivalent to swivel table 14 in Mader so that each camming element is maintained continuously in axial alignment with the crankpin to be indexed thereby. With such an arrangement, the angular indexing operation for each crankpin can be performed concurrently with the axial indexing operation for each crankpin in order to minimize the time delay between successive grinding operations.

In the case of crankshaft configuration having more than one crankpin disposed on a common axis, as described and illustrated in Fournier et al., it is possible to achieve the advantage of the second configuration described above with a reduced number of camming elements by providing one camming element continuously disposed in axial alignment with one crankpin in each group of coaxially disposed crankpins and operable each time a crankpin in that group is to be angularly indexed into the proper position for a grinding operation.

An object of this invention is the provision of means for rotatably supporting a crankshaft in a grinding machine including clamping means operative in a first mode to secure a crankshaft fixedly against rotation relative to the supporting means therefor during a grinding operation and selectively automatically operable in a second mode during an automatic angular indexing operation only to frictionally constrain a crankshaft against rotation relative to the supporting means therefor in order to permit precisely controlled relative angular displacement of a crankshaft by angular indexing means operable while the crankshaft is rotating with the supporting means therefor.

Another object of the present invention is an improvement of the clamping means disclosed in Fournier et al.

A particular object of the present invention is the simplification of the clamping means disclosed in Fournier et al. by the elimination of valve V15a (FIGURE 5) and cylinder 39c (FIGURE 5).

*Brief description of the drawing*

Other objects and advantages of the present invention will be readily apparent from the following description considered in relation to the showing in the accompanying drawing wherein the figure is partly a diagrammatic and partly a cross-sectional view of the improvement of the invention.

The improvement comprises a clamping actuating piston 1 slidable in a cylinder 2 for displacement to the left by fluid pressure introduced through inlet 9 to actuate the clamping assembly 27 and force the clamping jaw 37 and auxiliary clamping element 91 incorporating biasing spring 97 down upon the main crankshaft bearing W that is seated in the half bearing 35 which is positioned eccentrically in the pot chuck 118 as is also shown in FIGURE 3 of Fournier et al., and constitutes the second clamping jaw of the clamping assembly 27.

Auxiliary piston 5 of larger area than piston 1 has a sleeve 6 connected thereto and a coiled spring 3 interposed between the pistons 1 and 5 to function as the return spring for each of the pistons as required. The displacement of auxiliary piston 5 is limited by shoulder 8 to a predetermined small amount sufficient to reduce the pressure exerted upon a crankshaft by clamping assembly 27 enough to permit angular indexing of the crankshaft by a suitable angular indexing means such as that illustrated in Fournier et al. After a grinding operation has been performed on crankpin X subsequent crankpins are allowed to be angularly indexed by applying fluid pressure to the left side of auxiliary piston 5. When fluid pressure is applied to auxiliary piston 5 through inlet 7 to move piston 5 to the right, sleeve 6 connected thereto engages and displaces piston 1 a short distance determined by shoulder 8. This predetermined displacement of piston 1 to the right results in a small counter-clockwise displacement of clamping jaw 37, reducing the pressure applied to the crankshaft main bearing by the biasing spring 97 incorporated in the auxiliary clamping element 91 sufficiently to permit the rotation of the workpiece relative to the work holders into the correct position for grinding another crankpin.

Fluid pressure lines 7a and 9a are connected with inlets 7 and 9, respectively, through suitable passages including portions disposed concentrically of the rotating work holder 118 as indicated in the drawing. The pilot check valve V25 and conversion valve V35 are the operational equivalent of and replace valve V55 and the check valve connected in parallel therewith as shown in FIG. 5 of Fournier et al. Valves V5 and V15 correspond to the valves so designated in the showing in FIGURE 5 of Fournier et al. P represents the fluid pressure applied to the system.

The pilot check valve V25 in the form illustrated in the drawing includes a ball check valve operable automatically to prevent loss of pressure from the cylinder 2 in the event of loss of pressure in the system, so that the workpiece will not thereby be released from the clamping assembly 27. The pilot check valve V25 also includes a pilot piston 21 operable to lift the ball check valve off its seat when pressure P is admitted to line 5B by energization of valve V5 or energization of valve V15. It should be understood that pilot check valve V25 may be replaced by a pilot check valve of a different structural configuration capable of performing the same functions under the same operating conditions, since the structural details of the pilot check valve form no part of the present invention.

The conversion valve V35 comprises a housing connected as shown in the drawing and enclosing a freely movable piston valve member 31 moved to or maintained at the left-hand end of the conversion valve V35 when valve V5 is energized and moved to or maintained at the right-hand end of conversion valve V35 when the valve V15 is energized, so that the pressure and return lines controlled by valves V5 and V15 are selectively connected to line 5B.

*Description of the operation of the preferred embodiment*

When the main bearing W of a crankshaft is seated in the half bearing 35, the solenoid S5 of valve V5 is de-energized, as shown in the drawing, so that fluid pressure P is applied through valve V5, line 5A, the pilot check valve, line 9a and inlet 9 to move piston 1 to the left to secure the crankshaft main bearing W against rotation relative to the half bearing 35 by means of the clamping jaw 37 and auxiliary clamping element 91.

In order to grind successive crankpins on a given crankshaft, the crankshaft must be indexed to position each crankpin in the proper position for grinding. In order to permit the crankshaft to be rotated relative to the half bearing 35 and the work holder 118 on which it is mounted, the solenoid S15 of valve V15 is energized and fluid pressure P is admitted through pressure line 7a to inlet 7 simultaneously with a shift to the right of the piston valve member 31 in the conversion valve V35 to connect line 7a with line 5B and the pilot check valve V25, so that pilot piston 21 is moved to the right to unseat the ball check valve. The pressure applied through inlet 7 forces piston 5 and sleeve 6 attached thereto to the right until piston 5 engages shoulder 8. With this movement to the right, sleeve 6 contacts piston 1 and forces it a predetermined distance to the right with a resulting displacement of pressure fluid from cylinder 2 into line 9a and through the pilot check valve V25 into line 5A already at pressure P, so that the pressure within the cylinder 2 remains unchanged during the indexing operation. The predetermined small movement of piston 1 to the right produces an angular adjustment of clamping jaw 37 so that the pressure exerted against the crankshaft bearing W by auxiliary clamping element 91 and biasing spring 97 is reduced sufficiently to permit angular indexing of the crankshaft to position a selected crankpin for grinding. After each successive crankpin is indexed by suitable angular indexing means such as that illustrated in Fournier et al., the solenoid S15 of valve V15 is deenergized and a grinding operation is performed on that crankpin.

When the last crankpin has been ground, the solenoid S5 of valve V5 is energized to connect line 5A to exhaust and to deliver pressure P to the conversion valve V35 to shift the piston valve member 31 to the left as shown in the drawing so that pressure P is admitted to the pilot check valve through line 5B to displace the pilot piston 21 to the right to unseat the ball check valve to connect the cylinder 2 to exhaust through line 5A, so that the spring 3 returns the piston 1 to the right to open the clamping jaw 37 to release the crankshaft main bearing W. While the solenoid S5 of valve V5 remains energized a ground crankshaft is removed from the half bearing 35 and another crankshaft to be ground is deposited upon half bearing 35. Thereafter, the cycle described above is repeated for the newly inserted crankshafts.

While the operation of only a single clamping assembly 27 has been described above, it will be apparent from the showing in Fournier et al. that a crankshaft is actually supported and constrained by an opposed pair of clamping assemblies both operated concurrently in the manner described above.

An embodiment of the present invention is shown as it could be incorporated into the machine tool of Fournier et al. In FIGURE 5 of Fournier et al., the various machine elements as well as the various components of the hydraulic system and the electrical circuits are shown in their normal positions, that is with hydraulic pressure and electrical power absent which would otherwise cause the various components controlled thereby to be in positions opposite to those shown. However, FIGURE 5 does show a crankshaft W that has been loaded into the machine with traversing table 23 in a right hand position as seen in FIGURE 5 with crankpin 6 of the crankshaft W positioned opposite the grinding wheel 21 and on the axis of rotation of the work heads 115 and 116.

When the customary line switches, not illustrated in FIGURE 5, are closed, power is supplied to line L1 to energize the electrical circuits. Starting switch SW2 is closed to start the hydraulic pump P to deliver fluid under pressure to the hydraulically operated elements of the apparatus illustrated in FIGURE 5. Starting switch SW1 is closed to start the grinding wheel motor M to rotate the grinding wheel 21.

As is typical of such apparatus, the control circuits for initiating a grinding operation may be interlocked with the angular position of the pot chucks 117 and 118 by a suitable circular camming element concentric with one of the work heads provided with a depressed camming surface 121 to receive a follower roll 122 rotatably supported on a pivotally supported lever 123 for engagement with the depressed camming surface 121 when the pot chucks 117 and 118 are disposed in the proper angular position for unloading and loading work pieces and hence for initiating a grinding cycle. The lever 123, as shown in FIGURE 5, is normally spring biased in the counter-clockwise direction so that the lever 123 actuates a limit switch 7LS to close its normally open contacts as the follower roller 122 enters the depressed camming surface 121.

When the normally open contacts of limit switch 7LS are closed, as shown in FIGURE 5, the control relay 29CR is energized through the normally open now closed contacts of limit switch 21LS, closing the normally open contacts and opening the normally closed contacts of control relay 29CR. The closing of the normally open contacts of control relay 29CR supplies power to the selector switch SS and the normally closed contacts of time delay relay 5TR to energize the solenoid of valve V5 so that, as shown in the figure of the present invention, the conversion valve actuates the pilot check valve, the pressure on piston 1 is reduced through lines 9a and 5A, piston 1 moves to the right and crankshaft bearing W is fully unclamped.

When the solenoid of valve V5 of Fournier et al. and the present invention is deenergized, fluid pressure is applied, as shown in the drawing of the present invention, through pressure line 9a and inlet 9, piston 1 moves to the left and clamping jaw 37 with auxiliary clamping element 91 secure the crankshaft bearing W in the proper precisely aligned axial position for proper engagement of the grinding wheel with the crankpin to be ground.

As shown in FIGURE 5 of Fournier et al., when control relay 1CR having two sets of normally closed contacts is deenergized, power passes from the line L1 through selector switch SS, and closed contacts of time delay relay 5TR and control relay 29CR, and through one set of normally closed contacts of control relay 1CR to energize the solenoid of valve V15. As shown in the figure of the present invention, the energized valve V15 admits fluid pressure by line 7a to inlet 7 and piston 5 moves to the right until it engages shoulder 8 so that the pressure exerted against crankshaft bearing W is reduced sufficiently to permit angular indexing of another crankpin.

It will be understood that this invention is susceptible to modification in order to adapt it to different usages and conditions and, accordingly, it is desired to comprehend such modifications within this invention as may fall within the scope of the appended claims.

I claim:

1. In a machine tool rotatable work holder wherein said work holder supports a work piece eccentrically of the axis of rotation of said work holder and has means for retaining said work piece mounted upon said work holder operable during a machining operation for securing said work piece fixedly relative to said work holder about a predetermined axis spaced from said axis of rotation of said work holder and operable during an angular indexing operation to allow rotation of said workpiece relative to said work holder about said predetermined axis, the improvement comprising said means for retaining comprising a fluid pressure actuated clamping mechanism having a pair of relatively movable pistons of different cross sectional area wherein the smaller piston is actuated by a given fluid pressure in one direction securing said work piece fixedly relative to said work holder and is overpowered and displaced a predetermined short distance by the larger piston actuated by the same fluid pressure in the opposite direction allowing rotation of said work piece relative to said work holder during an angular indexing operation.

2. The work holder of claim 1, wherein said pair of relatively movable pistons of different cross sectional area has an interposed coiled piston return spring.

3. The work holder of claim 1, wherein said smaller piston interconnects clamping jaws for fixedly securing said work piece.

4. The work holder of claim 3, wherein one of said clamping jaws has an auxiliary clamping element for resiliently holding said work piece during an angular indexing operation.

5. The work holder of claim 3, wherein said smaller piston carries a piston rod interconnecting said clamping jaws and said larger piston carries a sleeve that is slidable on said piston rod and engages said smaller piston.

6. The work holder of claim 1, wherein said larger piston is mounted for movement in a cylinder and said cylinder has means limiting the movement of said larger piston toward said smaller piston.

References Cited

UNITED STATES PATENTS

| 2,471,706 | 5/1949 | Spongberg et al. | 51—237 X |
| 3,142,941 | 8/1964 | Fournier et al. | 51—105 |
| 3,171,234 | 3/1965 | Hill | 51—105 |

MYRON C. KRUSE, *Primary Examiner.*